United States Patent

[11] 3,615,350

[72] Inventor Robert W. Evers
 532 West Grant Pl., Chicago, Ill. 60614
[21] Appl. No. 742,001
[22] Filed July 2, 1968
[45] Patented Oct. 26, 1971

[54] PROCESS FOR TREATING AQUEOUS SUSPENSIONS OF IRON OXIDE WASTES
 5 Claims, 1 Drawing Fig.
[52] U.S. Cl. .................................................... 75/25, 75/26, 75/44
[51] Int. Cl. .................................................... C21b 3/00, C21b 1/30
[50] Field of Search .......................................... 75/3-5, 25, 2, 41, 44, 60, 26

[56] References Cited
UNITED STATES PATENTS

| | | | |
|---|---|---|---|
| 2,931,717 | 4/1960 | Lee ............................. | 75/3 |
| 3,180,723 | 4/1965 | McCauley .................... | 75/5 |
| 3,377,146 | 4/1968 | Von Stroh .................... | 75/3 X |
| 2,844,457 | 7/1958 | Amberg ........................ | 75/3 |
| 3,235,371 | 2/1966 | Volin ........................... | 75/3 |
| 3,403,018 | 9/1968 | Thom ........................... | 75/25 |

Primary Examiner—L. Dewayne Rutledge
Assistant Examiner—G. K. White
Attorneys—Johnston, Root, O'Keefe, Keil, Thompson & Shurtleff and John G. Premo ABSTRACT: A process for treating aqueous suspensions of the type resulting from the manufacture and processing of steel and iron whereby the suspended matter is recovered and utilized in the iron and steel manufacturing processes.

PATENTED OCT 26 1971 3,615,350
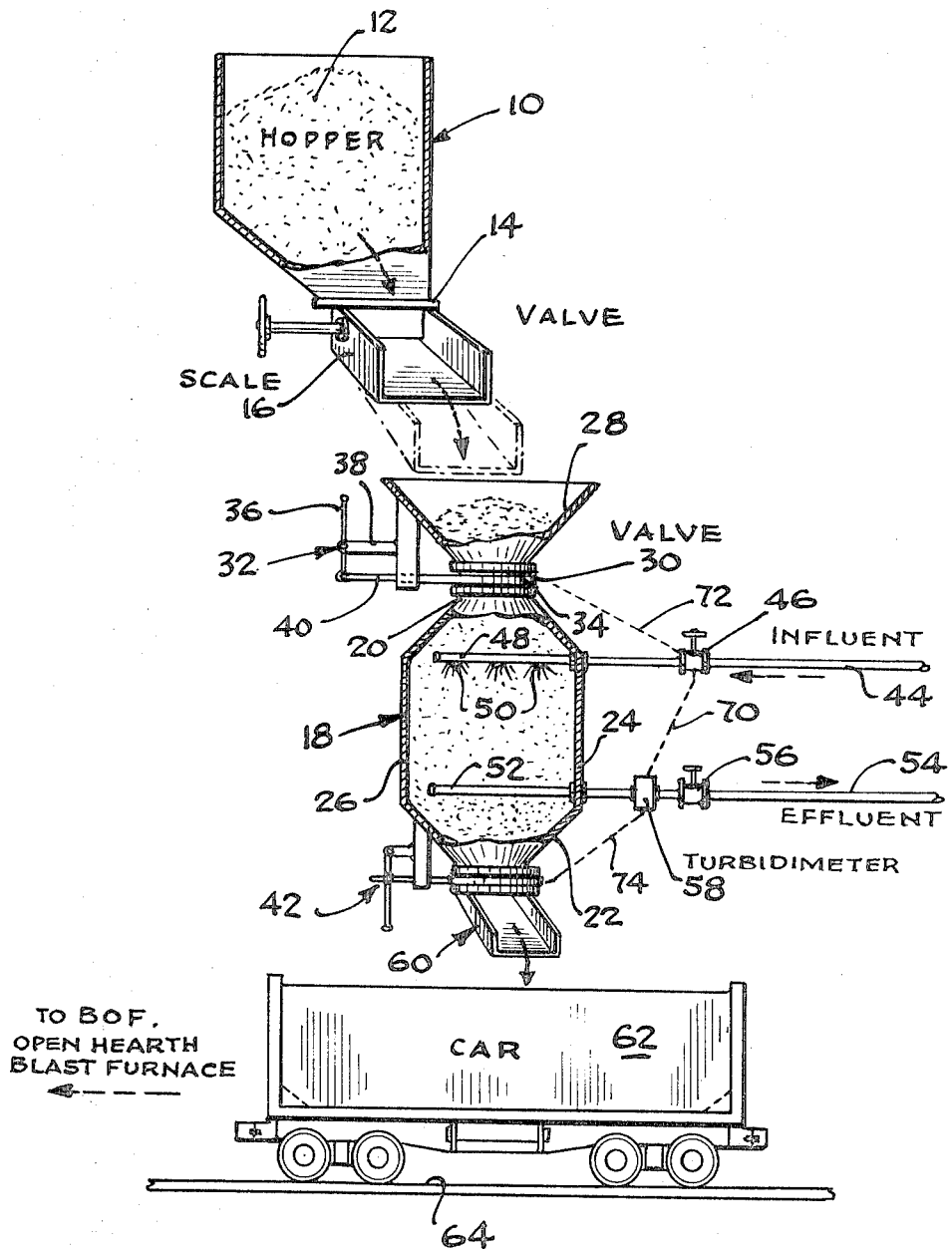
Inventor
Robert W. Evers
By Mazzall, Johnston, Cook & Root
Attorneys

PROCESS FOR TREATING AQUEOUS SUSPENSIONS OF IRON OXIDE WASTES

INTRODUCTION

The manufacture of iron and steel produces large quantities of aqueous suspensions of iron oxides. Typical of such suspensions are the waste products from hot strip rolling mills and from the aqueous purification systems used to treat the finely divided iron oxides resulting from the production of steel by such processes as the open hearth process and the basic oxygen furnace process (BOF).

One of the inherent problems connected with hot strip rolling is mill scale which forms on the surface of the workpiece. This scale is occasioned by the heating of the workpiece prior to its rolling in reheat furnaces. This scale is chemically composed of the well-known iron oxides, $FeO$, $Fe_2O_3$, $Fe_3O_4$.

To remove scale from the workpiece as it progresses through a hot strip mill, a number of scale-removing techniques and devices are used. Mechanical scale breakers are commonly found in these mills which remove scale by means of mechanical flexing. While scale breakers are effective to some extent in loosening scale, it is usually necessary to use in conjunction therewith high pressure water jets to abrade the loosened scale and remove it from the rolling area by a flushing action. These high pressure nozzles are frequently located before and after the scale breakers and are dispersed intermittently throughout the roughing and finishing operations.

The volumes of water used with the nozzles in scale removal processes is substantial. Many thousands of gallons of water are used per hour in operating these hydraulic scale-removing devices. It is customary to collect the water after it has been passed through the nozzle for reuse in the scale removing operations. This reused water is contaminated with excessively large quantities of suspended iron oxides which are detrimental to efficient operation of the nozzles.

Typical of a steelmaking process, which produces aqueous suspensions of finely divided iron oxide, is found in the production of steel by the basic oxygen furnace process (BOF). In this process a molten bath of steel is top blown with oxygen at a high velocity onto the surface of the steel. This technique, while allowing the rapid transformation of iron into steel, produces a large amount of iron oxide particles above the surface of the molten bath which is held in an open top refractory lined furnace or vessel. These particles are spewed forth from the top of the vessel in copious amounts. It is customary to collect the iron oxide particles by means of collecting systems which employ, in many instances, water scrubbing techniques for removing the extremely fine particles of iron oxide from the gases in which they are entrained. The effluents from these wet collection scrubbing processes are aqueous suspensions of finely-divided iron oxides. These suspensions are extremely difficult to treat for purposes of removing the suspended matter from the aqueous phase.

Similar suspensions of iron oxide particles are produced from the collection of flue dust wastes from electric furnaces and open hearth furnaces. Other sources of finely divided particles of iron which are removed from the atmosphere to adjacent steel processing operations are illustrated by aqueous slurries of such materials as blast furnace dust, steel manufacturing dust, dust from Bessemer converter operations, sintering dust, blast furnace slag particles and iron ore roasting dusts. These materials when collected in various types of wet dust collecting systems, produce aqueous suspensions of various types of iron oxides, which are in many cases difficult to treat whereby the suspended iron oxide is separated from the aqueous phase.

Another illustration of suspensions result from spent aqueous lubricating emulsions used in the cold-rolling operations for producing plate stock. These contaminated suspensions contain fats, oils and greases and are further characterized as being heavily contaminated with finely divided metallic particles and metallic oxides.

In an integrated steel operation, e.g. a mill that produces its own iron, steel and finished rolled and forged products, wastes of the above type create a serious problem from a pollution standpoint. Disposal of these wastes, without prior treatment to remove suspended contaminants, into river, lakes and streams is not compatible with modern-day practices from a pollution control standpoint. Removal of suspended matter from slurries of the type described above requires multiple stage water treatment processes be used to provide finished aqueous fluid suitable either for disposal or for reclamation and reuse within the steel making processes. Frequently it is necessary to use such well-known water treating practices as sedimentation, coagulation and filtration and the like to adequately remove the suspended solids from these systems. Even after being removed by conventional clarification techniques, the suspended matter in a dried solid form presents additional disposal problems due to the large quantities of solid materials involved.

It would be beneficial if it were possible to treat aqueous suspensions of the type previously discussed whereby substantial amounts of the suspended matter could be easily removed therefrom and disposed of by means of rescue in the steel making operation whereby additional steel or iron could be produced.

OBJECTS OF THE INVENTION

It is, therefore, an object of the invention to provide a method for simplifying the removal of substantial quantities of suspended solids from aqueous suspensions of wastes resulting from the manufacture and processing of iron and steel whereby the waste material is used in the manufacture of additional steel, thereby eliminating the problem of disposing of such materials. Other objects will appear hereafter.

THE INVENTION

In accordance with the invention there is provided a process for treating aqueous suspensions of wastes resulting from the manufacture and processing of iron and steel whereby the suspended phase of such suspensions are consumed in the conversion of iron ore and iron into iron and steel. In its simplest aspects the above is accomplished by following the sequential steps set forth below:

A. Forming into a filter bed a mass of finely divided particulate material which is capable of being used as a charge ingredient for the manufacture of iron or steel;

B. Passing aqueous wastes of the type described into contact with the filter bed for a period of time to sufficiently exhaust the adsorptive properties of the bed; and C. using the exhausted bed material which contains adsorbed thereon the suspended matter from the aqueous suspension as a charge ingredient for the manufacture of iron or steel.

THE AQUEOUS SUSPENSIONS

As indicated in the introduction of this disclosure, the aqueous suspensions upon which the invention operates result from such operations as high-pressure water treatments for scale removal in hot strip mills. They result from dust collection or scrubbing operations used in conjunction with such well-known processes as the open hearth or BOF processes, or they may result from cold-rolling operations.

The suspensions are characterized as containing as the suspended phase from as little as 10 p.p.m. up to as much as 30 percent by weight of finely divided iron oxides or combinations of iron oxides, finely divided iron, or steel particles in conjunction with metalworking lubricant wastes.

THE FINELY DIVIDED PARTICULATE MATERIAL

The finely divided particulate material is solid and is characterized as being capable of use as a charge ingredient for the conversion of iron ore or iron into iron and steel. Such substances are best illustrated by the well-known charge materials, limestone ($CaCO_3$), iron ore, coke and sinter plant pellets.

Of the above finely divided particulate materials, coke, limestone, sinter plant pellets and iron oxides provide the preferred materials.

In a preferred embodiment of the invention it is desirable that the finely divided particulate material having an average particle size diameter that does not exceed 5 millimeters and preferably is within the particle size range of from 0.15 to 1.5 millimeters.

All of the above particulate substances are capable of adsorbing substantial amounts of the suspended phase of the previously described aqueous suspensions, thereby allowing the suspended phase of these suspensions to be substantially reduced when the finely divided particulate materials are in the form of a filter bed used to treat these suspensions.

After the particulate material has exhausted its adsorptive capacity it is then removed from the filter in which it is employed and becomes a charge in the steel or iron making process. As a result of this use the adsorbed suspended solids, which predominate in the oxides of iron, are reused to produce iron or steel and the organic material, if any is present, is converted to the oxides of carbon due to the elevated temperatures at which iron and steel are produced.

For a more comprehensive understanding of the invention, reference may be had to the drawing.

THE DRAWING

The drawing is a vertical schematic view showing an arrangement of parts which allows the invention to be readily practiced under conditions normally encountered in integrated steelmaking operations.

With particular reference to the drawing there is shown at the top a hopper 10, which contains a finely divided particulate material 12, such as iron ore, coke, sinter pellets or limestone. Located at the bottom of the hopper is a valve assembly 14, which operates in horizontal sliding relationship to the hopper 10.

Positioned beneath the sliding valve 14 is a self-dumping scale 16, which releases its load when a predetermined amount of material is placed thereon. The scale is pivotally connected to the hopper 10 by suitable pivot means not shown.

Located beneath the scale 16 is a filter 18 having a top throat 20 and a bottom throat 22. The main body of the filter is of substantially cylindrical construction and is shown to have elongated vertical sidewalls 24 and 26.

Positioned at the top throat 20 is a funnel-shaped particulate receiving aperture 28. Finely divided particulate material leaving scale 16 empties into the funnel-shaped aperture 28. The finely divided particulate material enters the top throat 20 of the filter 18 through valved opening 30, which may be opened or closed by means of a horizontally positioned sliding valve assembly 32.

Valve assembly 32 has, as its main elements, horizontally positioned valve stem 34, which slides horizontally in response to actuation of pivoted lever 36 which pivots about pivot arms 38 and 40.

A valve arrangement similar to valve assembly 32 is provided at the bottom throat 22 of the filter 18. This valve assembly is generically referred to by numeral 42.

As shown in the drawing the filter 18 is filled with finely divided particulate substance which forms a filter bed. Entering near the top of sidewalls 24 of filter 18 is influent line 44, which is optionally fitted with either a manual or solenoid-controlled valve 46, whose function will be more fully described later. Influent line 44 within the filter 18 is connected to a manifold 48, which contains a plurality of downwardly or upwardly projecting distribution heads 50.

Positioned within the bottom of filter 18 is an effluent withdrawal manifold 52 which connects through the bottom of sidewall 24 with effluent line 54, which is also optionally fitted either with a manual or solenoid valve 56.

Also shown as being connected to effluent line 54 is a turbidimeter 58.

Located beneath valve assembly 42 at the bottom of filter 18 is a disposal chute which is positioned to empty a disposal railway-type car 62 which rides upon tracks 64, which go to an area of steel or ironmaking operation such as a BOF, open hearth or blast furnace.

In operation aqueous suspended solids influent entering the filter through influent line 44 is passed into contact with the finely divided particulate material within the filter 18 by means of manifold headers 50. The suspension passes downward through the filter and suspended solids are removed therefrom by means of adsorption. Purified effluent is removed from the filter through withdrawal manifold 52 into effluent line 54 where the purified water may be either disposed of or subjected to further treatment.

After the adsorptive capacity of the finely divided particulate material has been fully utilized, valve assembly 42 is opened and the finely divided particulate material containing the adsorbed particles from the treated aqueous suspension are emptied by means of disposal cute 60 into hopper car 62 where it is then transported to an iron or steelmaking location.

After the filter 18 is emptied valve assembly 42 is closed and additional material is supplied thereto by the opening of valve assembly 32, which allows a weighed amount of finely divided particulate material from scale 16 to be emptied into the filter 18. After the new filter bed is formed valve assembly 32 is closed and further influent is passed into contact with the filter bed.

To render the above described operation semiautomatic it is possible to use automated devices such as relays, and the like in conjunction with turbidimeter 58. When the effluent has increased in turbidity, indicating an exhaustion of the filter bed, the turbidimeter, by means of electrical control lines 70, 72 and 74 can close the influent valve 46 and open or close valve assembly 32 and valve assembly 42.

CONCLUSION

It is seen from the above that the invention provides an economic and simple means for removing suspended solids from aqueous suspensions of the type commonly found in integrated steel plants, whereby the suspended matter is capable of being utilized in the steelmaking operations.

I claim:

1. A process for treating aqueous suspensions of wastes resulting from the manufacture and processing of iron ore into iron and steel whereby the suspended phase of such suspensions are consumed in the conversion of iron ore and iron into iron and steel which comprise the steps of:
   a. forming into a filter bed a finely divided particulated material from the group consisting of the oxides of iron, limestone, sinter pellets and coke, which is used as a charge ingredient in the manufacture of iron or steel;
   b. passing an aqueous suspension of an iron oxide waste resulting from the manufacturing and processing of iron and steel into contact with said filter bed to remove the iron oxide waste from the aqueous suspension thereof and withdrawing from the filter bed a purified substantially iron oxide free aqueous fluid;
   c. continuing passing the aqueous suspension of ion oxide waste in contact with the filter bed for a period of time sufficient to substantially exhaust the adsorptive properties of said bed, and then,
   d. charging said exhausted bed as an ingredient in the manufacture of iron and steel.

2. The method of claim 1 where the finely divided particulate material is coke.

3. The method of claim 1 wherein the finely divided particulate material is iron ore.

4. The method of claim 1 where the finely divided particulate material is limestone.

5. The method of claim 1 where the finely divided particulate material is sinter pellets.

PO-1050
(5/69)

UNITED STATES PATENT OFFICE
CERTIFICATE OF CORRECTION

Patent No. 3,615,350            Dated October 26, 1971

Inventor(s) Robert W. Evers

It is certified that error appears in the above-identified patent and that said Letters Patent are hereby corrected as shown below:

First page, left-hand column, after "[45] Patented Oct. 26, 1971" insert -- [73] Assignee Nalco Chemical Company Chicago, Ill. --.

Column 2, line 5, "river" should read -- rivers --.

Column 4, line 60, Claim 1, "ion" should read -- iron --.

Signed and sealed this 2nd day of May 1972.

(SEAL)
Attest:

EDWARD M. FLETCHER, JR.            ROBERT GOTTSCHALK
Attesting Officer                     Commissioner of Patents